United States Patent
Nagami et al.

(10) Patent No.: US 10,147,956 B2
(45) Date of Patent: Dec. 4, 2018

(54) FUEL CELL ELECTRODE CATALYST, PRODUCTION METHOD THEREOF, AND FUEL CELL

(71) Applicant: TOYOTA JIDOSHA KABUSHIKI KAISHA, Toyota-shi, Aichi-ken (JP)

(72) Inventors: Tetsuo Nagami, Nagoya (JP); Tooru Yamamoto, Toyota (JP); Masaharu Tsuji, Fukuoka (JP); Keiko Uto, Fukuoka (JP); Junichiro Hayashi, Kasuga (JP); Hideoki Fukushima, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/637,595

(22) Filed: Jun. 29, 2017

(65) Prior Publication Data

US 2018/0006312 A1 Jan. 4, 2018

(30) Foreign Application Priority Data

Jun. 30, 2016 (JP) .................................. 2016-129709

(51) Int. Cl.
*H01M 8/00* (2016.01)
*H01M 4/90* (2006.01)
*H01M 4/86* (2006.01)
*H01M 4/88* (2006.01)
*H01M 4/92* (2006.01)

(52) U.S. Cl.
CPC ....... *H01M 4/9075* (2013.01); *H01M 4/8652* (2013.01); *H01M 4/8803* (2013.01); *H01M 4/921* (2013.01)

(58) Field of Classification Search
CPC ...................................................... H01M 8/00
USPC ............................................................ 429/400
See application file for complete search history.

(56) References Cited

U.S. PATENT DOCUMENTS

2015/0202598 A1* 7/2015 Kallesoe ............... H01M 4/926
429/524

FOREIGN PATENT DOCUMENTS

JP 2015-185428 A 10/2015

OTHER PUBLICATIONS

Patricia Hernandez-Fernandez et al.: "Mass-selected nanoparticles of $Pt_xY$ as model catalysts for oxygen electroreduction," Nature Chemistry, 2014, 6, 732-738.

(Continued)

*Primary Examiner* — Jacob B Marks
(74) *Attorney, Agent, or Firm* — Sughrue Mion, PLLC

(57) ABSTRACT

A production method of a fuel cell electrode catalyst includes: a supporting step of causing platinum and yttrium to be supported on a carrier using a nonaqueous solvent; and an acid treatment step of performing an acid treatment on the carrier on which platinum and yttrium are supported.

6 Claims, 10 Drawing Sheets

(56) References Cited

OTHER PUBLICATIONS

Min Ku Jeon et al.: "Carbon supported Pt-Y electrocatalysts for the oxygen reduction reaction," Journal of Power Sources, 196 (2011), 1127-1131.
Ifan E. L. Stephens et al.: "Oxygen Electroreduction Activity and X-Ray Photoelectron Spectroscopy of Platinum and Early Transition Metal Alloys," ChemCatChem 2012, 4, 341-349.
Sung Jong Yoo et al.: "$Pt_3Y$ electrocatalyst for oxygen reduction reaction in proton exchange membrane fuel cells," International Journal of Hydrogen Energy, 37 (2012), 9758-9765.
Sung Jong Yoo et al.: "Enhanced stability and activity of Pt-Y alloy catalysts for electrocatalytic oxygen reduction," Chem. Commun., 2011, 47, 11414-11416.

* cited by examiner

COMPARATIVE EXAMPLE 4   COMPARATIVE EXAMPLE 5   COMPARATIVE EXAMPLE 6

AFTER NITRIC ACID TREATMENT

EXAMPLE 1   EXAMPLE 2   EXAMPLE 3

BEFORE NITRIC ACID TREATMENT:
COMPARATIVE EXAMPLE 4

TEM

TEM-EDS

AFTER NITRIC ACID TREATMENT:
EXAMPLE 1

FIG. 4A
BEFORE NITRIC ACID TREATMENT:
COMPARATIVE EXAMPLE 5
TEM
FIG. 4B
AFTER NITRIC ACID TREATMENT:
EXAMPLE 2
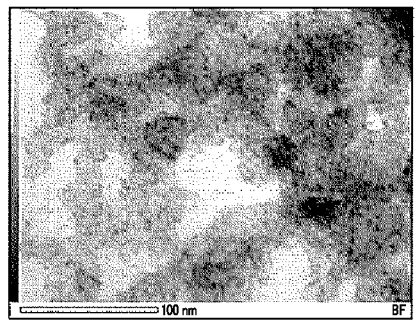
TEM-EDS
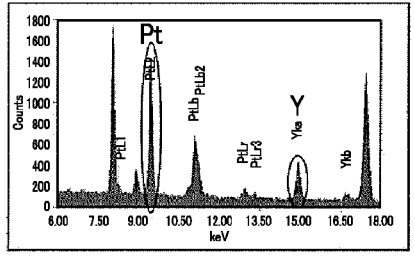
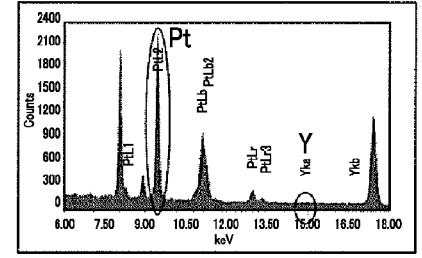
FIG. 5A
BEFORE NITRIC ACID TREATMENT:
COMPARATIVE EXAMPLE 6
TEM
FIG. 5B
AFTER NITRIC ACID TREATMENT:
EXAMPLE 3
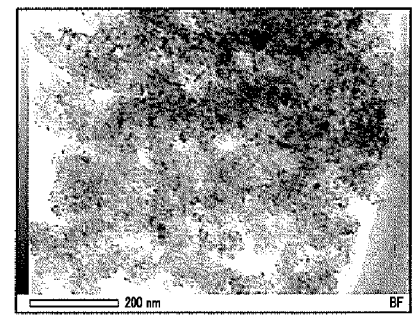
TEM-EDS
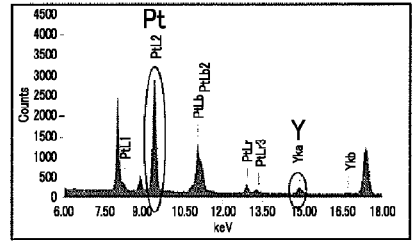
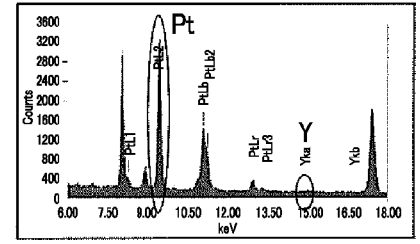

FUEL CELL ELECTRODE CATALYST, PRODUCTION METHOD THEREOF, AND FUEL CELL

INCORPORATION BY REFERENCE

The disclosure of Japanese Patent Application No. 2016-129709 filed on Jun. 30, 2016 including the specification, drawings and abstract is incorporated herein by reference in its entirety.

BACKGROUND

1. Technical Field

The present disclosure relates to a fuel cell electrode catalyst, a production method of a fuel cell electrode catalyst, and a fuel cell.

2. Description of Related Art

A fuel cell is a power generation device that can continuously produce electric power by replenishing a fuel and has a small environmental burden. Due to the growing interest in global environmental protection in recent years, there are great expectations for fuel cells. In addition, since fuel cells have high power generation efficiency and enable a reduction in the size of a system, fuel cells are expected to be used in various fields, for example, portable devices such as personal computers and mobile phones, and vehicles such as cars and railroad cars.

A fuel cell consists of a pair of electrodes (a cathode and an anode) and an electrolyte, and the electrode includes a carrier and an electrode catalyst made of a catalytic metal supported on the carrier. In general, platinum or a platinum alloy is used as the catalytic metal in the fuel cell. Since platinum is a rare resource, an improvement in the activity of the electrode catalyst is required for a reduction in platinum usage.

In particular, since a cathode reaction has a slower reaction rate than an anode reaction, the cathode requires a larger amount of platinum. Therefore, there have been measures to improve the activity of the cathode reaction, that is, an oxygen reduction reaction (ORR).

For example, in Journal of Power Sources, 196 (2011), 1127-1131, a method of producing a $Pt_3Y/C$ catalyst and a PtY/C catalyst by mixing $H_2PtCl_6 \cdot 6H_2O$, $Y(NO_3)_3 \cdot 6H_2O$, a carbon carrier (C), and a mixed solvent of methanol and deionized water (1:80, v/v), adding a reducing agent ($NaBH_4$) to the mixture, and baking the resultant in a hydrogen atmosphere is disclosed.

In Journal of Power Sources, 196 (2011), 1127-1131, it is disclosed that the $Pt_3Y/C$ catalyst and the PtY/C catalyst have a higher specific activity than a Pt/C catalyst in an oxygen reduction reaction. However, as reported by the authors, experimental evidence that a Y component is contained in the catalyst prepared in this literature has not been obtained from XRD analysis results, and $Pt_3Y$ and PtY mentioned here simply represent the molar mixing ratio between Pt and Y precursor samples during the preparation and do not represent the compositional ratio of the products.

In Chem. Commun., 2011, 47, 11414-11416, production of thin film catalysts of $Pt_{91}Y_9$, $Pt_{86}Y_{14}$, $Pt_{78}Y_{22}$, $Pt_{70}Y_{30}$, and $Pt_{64}Y_{36}$ by a sputtering method is disclosed. In Chem. Commun., 2011, 47, 11414-11416, it is disclosed that these catalysts have a higher specific activity than a Pt catalyst in an oxygen reduction reaction.

In International Journal of Hydrogen Energy, 37 (2012), 9758-9765, formation of a nanoparticle catalyst of $Pt_3Y$ on a gas diffusion layer (GDL) by a sputtering method is disclosed.

In International Journal of Hydrogen Energy, 37 (2012), 9758-9765, it is disclosed that the $Pt_3Y$ catalyst has a higher specific activity than a Pt catalyst in an oxygen reduction reaction.

In ChemCatChem 2012, 4, 341-349, production of thin film catalysts of $Pt_3Y$ and $Pt_5Y$ by a sputtering method is disclosed.

In ChemCatChem 2012, 4, 341-349, it is disclosed that these catalysts have a higher specific activity than a Pt catalyst in an oxygen reduction reaction.

In Nature Chemistry, 2014, 6, 732-738, production of a nanoparticle catalyst of $Pt_xY$ by a sputtering method is disclosed.

In Nature Chemistry, 2014, 6, 732-738, it is disclosed that the $Pt_xY$ catalyst has a higher specific activity than a Pt catalyst in an oxygen reduction reaction.

Japanese Patent Application Publication No. 2015-185428 (JP 2015-185428 A) discloses a fuel cell catalyst in which platinum and yttrium are supported on a conductive carrier. As a production method of the fuel cell catalyst, JP 2015-185428 A discloses a method of mixing the conductive carrier, a platinum-containing solution, and an yttrium-containing solution in an aqueous solution, adding a reducing agent thereto under basic conditions, and baking the resultant in a hydrogen atmosphere. It is disclosed that in terms of the compositional ratio between metals, platinum occupies 76.5 atom % and yttrium occupies 23.5 atom % in the fuel cell catalyst obtained by the production method of JP 2015-185428 A.

SUMMARY

In an alloy catalyst of platinum and transition metal, the catalyst activity is not improved unless the atomic ratio (Pt/transition metal) of platinum to a transition metal is caused to be about 3 to 10 or the transition metal is increased to about 9 to 25 atom %. However, when such an alloy catalyst is used in a fuel cell for a long period of time, the transition metal elutes as a cation, which inhibits proton conduction. Also, since proton conduction is rate-determining under high temperature conditions, elution of the transition metal as a cation also causes deterioration in high temperature performance.

In addition to the alloy catalyst, a core-shell catalyst with palladium as the core and platinum as the shell has also been developed. However, even in the core-shell catalyst, palladium elutes from defective portions of the platinum shell as a cation, resulting in the same problem as the alloy catalyst.

Therefore, the present disclosure provides a production method of a catalyst which achieves both the improvement of a catalyst activity and the suppression of cation elution.

As a result of intensive studies by the inventors, it was found that yttrium improves the activity of platinum even in a trace amount. When yttrium is in a trace amount, it is difficult for yttrium to elute as cation, and thus inhibition of proton conduction can be avoided. A desired catalyst can be produced by causing platinum and yttrium to be supported on a carrier using a nonaqueous solvent and performing an acid treatment thereon.

According to a first aspect of the present disclosure, there is provided a production method of a fuel cell electrode catalyst, including: a supporting step of causing platinum and yttrium to be supported on a carrier using a nonaqueous solvent; and an acid treatment step of performing an acid treatment on the carrier on which platinum and yttrium are supported.

The supporting step may include irradiating a mixture containing the nonaqueous solvent, platinum, yttrium, and the carrier with microwaves.

The supporting step may include removing the nonaqueous solvent from the mixture containing the nonaqueous solvent, platinum, yttrium, and the carrier, for example, by filtration or distillation, and performing a heat treatment on the mixture from which the nonaqueous solvent has been removed, in a hydrogen atmosphere.

By the acid treatment step, an atomic ratio (Pt/Y) of platinum to yttrium in the fuel cell electrode catalyst is caused to be 100 to 250.

A second aspect of the present disclosure relates to a fuel cell electrode catalyst produced by the production method described above.

A third aspect of the present disclosure relates to a fuel cell including the fuel cell electrode catalyst described above.

According to the present disclosure, it is possible to provide a production method of a catalyst which achieves both the improvement of a catalyst activity and the suppression of cation elution.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A shows a TEM photograph and a TEM-EDS analysis result of the catalyst (Comparative Example 5) before and after the acid treatment;

FIG. 4B shows a TEM photograph and a TEM-EDS analysis result of the catalyst (Example 2) before and after the acid treatment;

FIG. 5A shows a TEM photograph and a TEM-EDS analysis result of the catalyst (Comparative Example 6) before and after the acid treatment;

FIG. 5B show a TEM photograph and a TEM-EDS analysis result of the catalyst (Example 3) before and after the acid treatment;

DETAILED DESCRIPTION OF EMBODIMENTS

Figure 1:
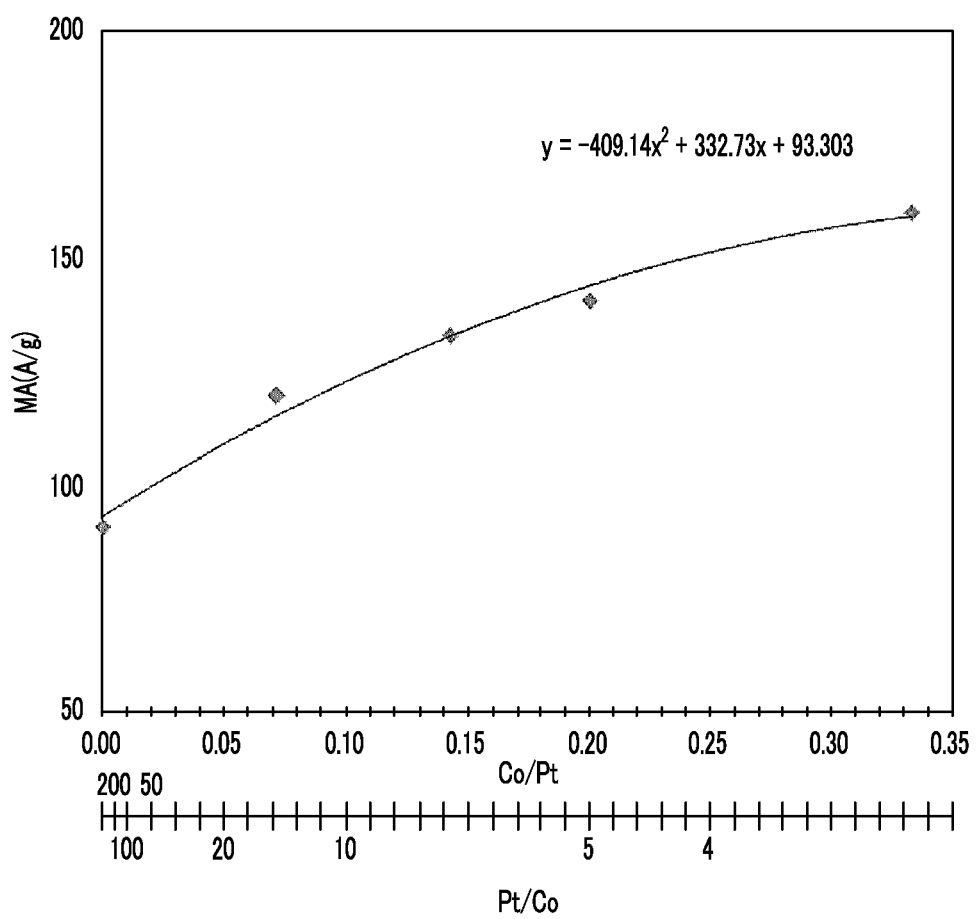
FIG. 1 shows a relationship between a metal component ratio (atomic ratio) and a mass activity (MA) in a PtCo catalyst.

This specification also refers to phenomena postulated from experimental results, but the scope of the present disclosure is not limited based on this phenomenon. That is, even if a phenomenon different from the postulated phenomena described in this specification has occurred, actions that satisfy the features of the disclosure described in the claims are included in the scope of the present disclosure.

An embodiment of the present disclosure relates to a production method of a fuel cell electrode catalyst including a supporting step and an acid treatment step. Another embodiment of the present disclosure relates to a fuel cell electrode catalyst produced by the production method mentioned above.

Hereinafter, the supporting step and the acid treatment step in the production method of a fuel cell electrode catalyst will be described.

<Supporting Step> The supporting step is a step of supporting platinum and yttrium on a carrier using a nonaqueous solvent. In the supporting step, a small amount of yttrium forms an alloy with platinum and is supported on the carrier. The remaining yttrium is supported on the carrier in the form of an oxide without forming an alloy. In a supporting step in an aqueous solution in a method of the related art, yttrium is supported as a hydroxide on a carrier. However, when a nonaqueous solvent is used as in this embodiment, yttrium is supported on the carrier as an oxide.

Examples of the nonaqueous solvent include an organic solvent. As the organic solvent, a monohydric alcohol having a boiling point of 140° C. or higher (for example, heptyl alcohol, octyl alcohol, decyl alcohol, and dodecyl alcohol having seven or more carbon chains), a polyhydric alcohol having two or more alcoholic hydroxyl groups (ethylene glycol, propylene glycol, triethylene glycol, and glycerin although the number of carbon atoms is not particularly limited), or the like may be used.

A source of platinum is not particularly limited as long as the source is a compound containing platinum. Examples thereof include a diammine dinitro platinum(II) nitric acid solution, bis(acetylacetonate) platinum(II), hexachloroplatinic(IV) acid hexahydrate, potassium tetrachloroplatinate (II), a hexaammineplatinum(IV) chloride solution, tetraammineplatinum(II) chloride, and a tetraammineplatinum(II) hydroxide solution.

A source of yttrium is not particularly limited as long as the source is a compound containing yttrium. Examples thereof include yttrium acetate tetrahydrate, yttrium nitrate hexahydrate, tris(acetylacetonate)yttrium(III) trihydrate, yttrium(III) chloride (anhydrous), yttrium(III) chloride (hexahydrate), yttrium(III) octanoate, yttrium(III) perchlorate (nonahydrate), yttrium(III) formate (n-hydrate), yttrium (III) citrate (n-hydrate), yttrium(III) stearate, yttrium(III)

carbonate (n-hydrate), yttrium(III) naphthenate, yttrium(III) propionate (n-hydrate), and yttrium(III) laurate.

As the carrier, carriers that are generally used in fuel cell electrode catalysts may be employed. For example, as a carbon carrier, carbon black such as Ketjen EC manufactured by Lion Corporation, VULCAN XC-72 manufactured by Cabot Corporation, OSAB, CA250, AB, and SAB manufactured by Denka Company Limited, YS manufactured by SN2A, and TOKABLACK manufactured by Tokai Carbon Co., Ltd., acetylene black, graphitized carbon, and carbon obtained by activating these types of carbon with acid or air may be employed.

The amounts of the source of platinum and the source of yttrium to be used are determined in consideration of the fact that most of the yttrium is removed in the acid treatment step described below. The amounts of the source of platinum and the source of yttrium to be used can be appropriately determined by those skilled in the art so that a desired catalyst composition can be achieved through the acid treatment step.

As an aspect of the supporting step, a mixture containing the nonaqueous solvent, platinum, yttrium and the carrier may be irradiated with microwaves. The conditions of microwave irradiation are not particularly limited as long as platinum and yttrium can be supported on the carrier, and examples thereof include about 10 minutes to about 90 minutes at about 200 W to about 800 W, about 20 minutes to about 60 minutes at about 300 W to about 600 W, and about 30 minutes at about 400 W. It is postulated that an improvement in the adhesion between the catalytic metal and the carrier through microwave heating contributes to an increase in the activation of the catalyst that is finally obtained.

As another aspect of the supporting step, the nonaqueous solvent may be removed from the mixture containing the nonaqueous solvent, platinum, yttrium and the carrier, for example, by filtration or distillation, and the mixture from which the nonaqueous solvent has been removed may be subjected to a heat treatment in a hydrogen atmosphere. The conditions of the heat treatment are not particularly limited as long as platinum and yttrium can be supported on the carrier, and examples thereof include about 1 hour to about 6 hours at about 200° C. to about 1000° C., about 1.5 hours to about 4 hours at about 400° C. to about 800° C., and about 2 hours at about 600° C.

In this specification, "about" means a range of ±10% of a specified number.

<Acid Treatment Step> The acid treatment step is a step of treating with an acid the carrier on which platinum and yttrium are supported in the supporting step. By the acid treatment step, yttrium oxides that do not form alloys are removed while a small amount of yttrium that forms an alloy with platinum is left. Even with a small amount of yttrium that forms the alloy, the activity of the catalyst can be improved. In addition, since most of the yttrium oxides that do not form alloys are removed, yttrium is less likely to be eluted in the fuel cell, and consequently the inhibition of proton conduction can be avoided. Accordingly, a catalyst that achieves both the improvement of the catalyst activity and the suppression of cation elution is produced.

The acid is not particularly limited as long as the acid can dissolve yttrium oxides. Examples thereof include inorganic acids (such as nitric acid, hydrochloric acid, and sulfuric acid).

It is preferable that the atomic ratio (Pt/Y) of platinum to yttrium in the catalyst is caused to be 100 to 250 by the acid treatment. With such an atomic ratio, the improvement of the catalyst activity and the suppression of cation elution can be satisfactorily achieved.

The conditions of the acid treatment are not particularly limited as long as a desired Pt/Y (atomic ratio) can be achieved by removing yttrium oxides that do not form alloys, and examples thereof include about 0.5 hours to about 24 hours at about 40° C. to about 80° C.

Surprisingly, between the case of removing yttrium in the form of an oxide supported as in this embodiment and the case of removing yttrium in the form of a hydroxide supported as in the method of the related art, the activity is significantly different even though the Pt/Y (atomic ratio) in the catalyst that is finally obtained is the same. As the main reason why the activity of the catalyst synthesized by microwave heating is high, it is postulated that during the microwave heating, the carbon carrier absorbs the microwaves and the surface thereof is locally heated, the adhesion between the Pt catalyst containing the yttrium oxides and the carrier is improved, and thus sufficiently high adhesion between the catalyst and the carrier for improving the catalyst activity is maintained even after the yttrium oxides are removed by the acid treatment.

<Fuel Cell> Another embodiment of the present disclosure relates to a fuel cell including the electrode catalyst. The electrode catalyst can be combined with an ionomer to form an electrode. A fuel cell consists of a cell stack with stacked single cells in which a membrane electrode assembly (MEA) consisting of a pair of electrodes (a cathode and an anode) and an electrolyte membrane is sandwiched between a pair of separators.

The electrode containing the electrode catalyst may be used as a cathode, as an anode, or as both a cathode and an anode.

Examples of the ionomer include NAFION (registered trademark) DE 2020, DE 2021, DE 520, DE 521, DE 1020, and DE 1021 manufactured by DuPont, and ACIPLEX (registered trademark) SS700C/20, SS900/10, and SS1100/5 manufactured by Asahi Kasei Chemicals Corporation.

Examples of the fuel cell include a polymer electrolyte fuel cell (PEFC), a phosphoric acid fuel cell (PAFC), a molten carbonate fuel cell (MCFC), a solid oxide fuel cell (SOFC), an alkaline electrolyte fuel cell (AFC), and a direct methanol fuel cell (DFC).

Hereinafter, the present disclosure will be described in more detail with reference to examples and comparative examples, but the technical scope of the present disclosure is not limited thereto.

<Catalyst Preparation>

Example 1

Acetylene black (0.06 g, YS manufactured by SN2A) treated in air at 540° C. for 5 hours was added to ethylene glycol (50 ml) and was dispersed by ultrasonic waves for 30 minutes. A KOH-ethylene glycol solution was further added thereto and Ar gas was bubbled for 30 minutes while stirring the solution. An ethylene glycol solution of yttrium acetate tetrahydrate [$(CH_3COO)_3Y \cdot 4H_2O$] and a dinitrodiammine platinum nitric acid solution were further added thereto. The concentrations of KOH in ethylene glycol (50 ml), yttrium acetate tetrahydrate, and the dinitrodiammine platinum nitric acid solution were 12 mM, 2 mM, and 6 mM, respectively. While stirring and bubbling of Ar gas were performed, microwaves (400 W) were irradiated for 30 minutes for heating and reflux. At the time point when the microwaves were irradiated for 2 minutes, the temperature of the solution had reached the boiling point (197° C.) of ethylene glycol. After water cooling, the suspension was transferred to a centrifuge tube, distilled water was added thereto, centrifugation was performed thereon, and the supernatant was removed. An operation of adding distilled water again, performing centrifugation, and removing the supernatant was repeated twice. Distilled water was added to the obtained solid content, and the resultant was subjected to suction filtration, dried in air at 80° C. for 21 hours by a drier, and crushed with a mortar, thereby obtaining a catalyst.

The obtained catalyst was subjected to an acid treatment with nitric acid (0.1 to 2 N) at 40° C. to 80° C. for 0.5 to 24 hours, followed by drying and crushing.

Example 2

A catalyst was obtained by performing the same operation as in Example 1 except that the amount of yttrium acetate tetrahydrate was changed to 5 mM and the amount (as Pt) of the dinitrodiammine platinum nitric acid solution was changed to 5 mM.

Example 3

A catalyst was obtained by performing the same operation as in Example 1 except that the amount of yttrium acetate tetrahydrate was changed to 5 mM and 5 mM (as Pt) of bis(acetylacetonate) platinum(II) [$Pt(C_5H_7O_2)_2$] was used instead of the dinitrodiammine platinum nitric acid solution.

Example 4

Acetylene black (0.7 g, YS manufactured by SN2A) treated in air at 540° C. for 5 hours was added to acetone (150 ml) and was stirred. An acetone solution of bis(acetylacetonate) platinum(II) (0.66 g) and an acetone solution of yttrium nitrate hexahydrate [$Y(NO_3)_3 \cdot 6H_2O$] (0.22 g) were further added thereto and were dispersed by ultrasonic waves to be stirred for 2 hours. Acetone was removed with an evaporator and the resultant was dried with air. The resultant was subjected to a heat treatment in a 2% $H_2$/Ar atmosphere at 600° C. for 2 hours, thereby obtaining a catalyst.

The obtained catalyst was subjected to an acid treatment with nitric acid (0.1 to 2 N) at 40 to 80° C. for 0.5 to 24 hours, followed by drying and crushing.

Comparative Example 1

An aqueous solution of nitric acid (0.1 N, 1500 g) was added to acetylene black (12 g, YS manufactured by SN2A) treated in air at 540° C. for 5 hours and was dispersed. A dinitrodiammine platinum nitric acid solution (8 g as Pt) and ethanol (99.5%, 100 g) were sequentially added thereto, and the resultant was sufficiently stirred and heated at 60° C. to 90° C. for 3 hours. The dispersed liquid was repeatedly filtered and washed until the conductivity of the filtrate reached 5 μS/cm or less. The obtained solid content was dried with air at 80° C. for 15 hours, and was subjected to a heat treatment in an Ar atmosphere at 700° C. (heating rate 5° C./min, maintained for 2 hours), thereby obtaining a catalyst.

The obtained catalyst was subjected to an acid treatment with nitric acid (0.1 to 2 N) at 40° C. to 80° C. for 0.5 to 24 hours, followed by drying and crushing.

Comparative Example 2

Distilled water (1100 g) was added to acetylene black (10 g, YS manufactured by SN2A) treated in air at 540° C. for 5 hours and was dispersed. A dinitrodiammine platinum nitric acid solution (10 g as Pt) and an aqueous solution of yttrium nitrate hexahydrate (6.55 g) were further added thereto and stirred. An aqueous solution (1000 g) of sodium borohydride [$NaBH_4$] (2.59 g) was added until a pH of 9.50 and an oxygen reduction potential (ORP) of −750 mV (with respect to an Ag—AgCl electrode) were reached. After stirring for 2 hours, the resultant was filtered, washed, and dried with air at 80° C. for 15 hours. The obtained solid content was subjected to a heat treatment in an $H_2$ atmosphere at 700° C. for 2 hours and was crushed, thereby obtaining a catalyst.

Comparative Example 3

The catalyst obtained in Comparative Example 2 was subjected to an acid treatment with nitric acid (0.1 to 2 N) at 40 to 80° C. for 0.5 to 24 hours, followed by drying and crushing.

Comparative Example 4

A catalyst was obtained by performing the same operation as in Example 1 except that the acid treatment was not performed.

Comparative Example 5

A catalyst was obtained by performing the same operation as in Example 2 except that the acid treatment was not performed.

Comparative Example 6

A catalyst was obtained by performing the same operation as in Example 3 except that the acid treatment was not performed.

Comparative Example 7

A catalyst was obtained by performing the same operation as in Example 4 except that the acid treatment was not performed.

Comparative Example 8

An aqueous solution of nitric acid (0.1 N, 1500 g) was added to acetylene black (12 g, YS manufactured by SN2A) treated in air at 540° C. for 5 hours and was dispersed. A dinitrodiammine platinum nitric acid solution (8 g as Pt) and ethanol (99.5%, 100 g) were sequentially added thereto, and the resultant was sufficiently stirred and heated at 60° C. to 90° C. for 3 hours. The dispersed liquid was repeatedly filtered and washed until the conductivity of the filtrate reached 5 μS/cm or less. The obtained solid content was dried with air at 80° C. for 15 hours, and was subjected to a heat treatment in an Ar atmosphere at 700° C. (heating rate 5° C./min, maintained for 2 hours).

The obtained platinum-supporting carrier was dispersed in pure water (80 times the amount of the carrier), and an aqueous solution of cobalt nitrate hexahydrate was added thereto in an amount such that the molar ratio of Pt:Co reached 2:1. An aqueous solution of sodium borohydride (a molar amount of 1 to 6 times the molar amount of Co) was added thereto, was stirred for 1 to 20 hours, and was repeatedly filtered and washed until the conductivity of the filtrate reached 5 μS/cm or less. The obtained solid content was dried with air at 80° C. for 15 hours, and was subjected to a heat treatment in an Ar atmosphere at 700° C. (heating rate 5° C./min, maintained for 2 hours), thereby obtaining an alloyed catalyst.

The obtained catalyst was subjected to an acid treatment with nitric acid (0.1 to 2 N) at 40 to 80° C. for 0.5 to 24 hours, followed by drying and crushing.

<Evaluation Method of Physical Properties and Performance>

(1) Composition Analysis (Table 1)

After the catalyst powder is subjected to ashing, the residue is melted with $Na_2O_2$, and the amount of Pt and the amount of Y are analyzed using an inductively coupled plasma (ICP) analyzer (PS3520 manufactured by Hitachi High-Tech Science Corporation). In addition, based on this value, the atomic ratio of Pt/Y is calculated by calculation.

Figure 2A:
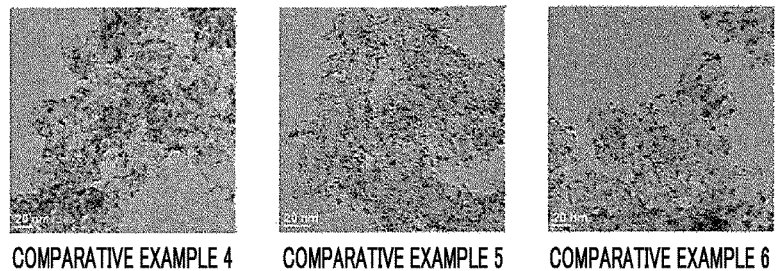
FIG. 2A shows enlarged TEM photographs of catalysts (Comparative Examples 4 to 6) before and after an acid treatment.
Figure 2B:
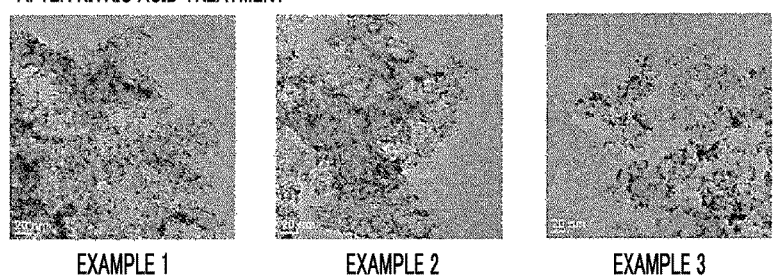
FIG. 2B shows enlarged TEM photographs of catalysts (Examples 1 to 3) before and after the acid treatment.
Figure 3A:
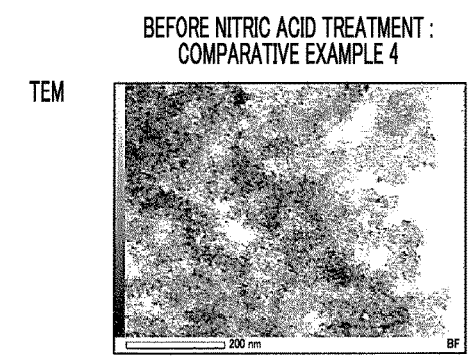
FIG. 3A shows a TEM photograph and a TEM-EDS analysis result of the catalyst (Comparative Example 4) before and after the acid treatment.
Figure 3A:
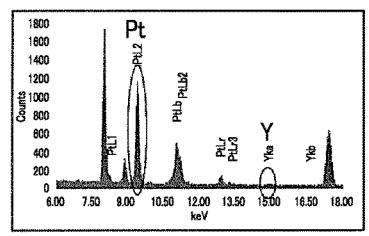
Figure 3B:
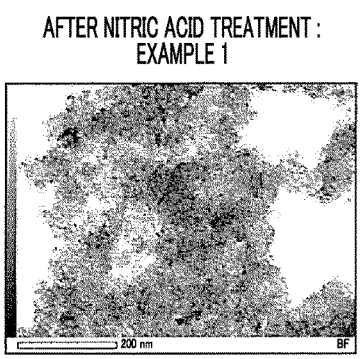
FIG. 3B shows a TEM photograph and a TEM-EDS analysis result of the catalyst (Example 1) before and after the acid treatment.
Figure 3B:
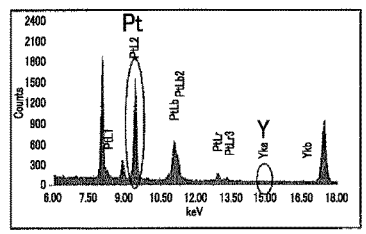

(2) TEM Observation Analysis (FIGS. 2A and 2B)

Using a TEM apparatus (JEM-2100F, manufactured by JEOL Ltd.), the catalyst powder is collected in a TEM observation grid, and is observed and analyzed at an accelerating voltage of 200 kV.

(3) TEM-EDS Observation Analysis (FIGS. 3A, 3B, 4A, 4B, 5A, and 5B)

Using a TEM-EDS apparatus (JEM-2100F manufactured by JEOL Ltd.), the catalyst powder is collected in a TEM observation grid, and is observed and analyzed at an accelerating voltage of 200 kV.

Figure 8:
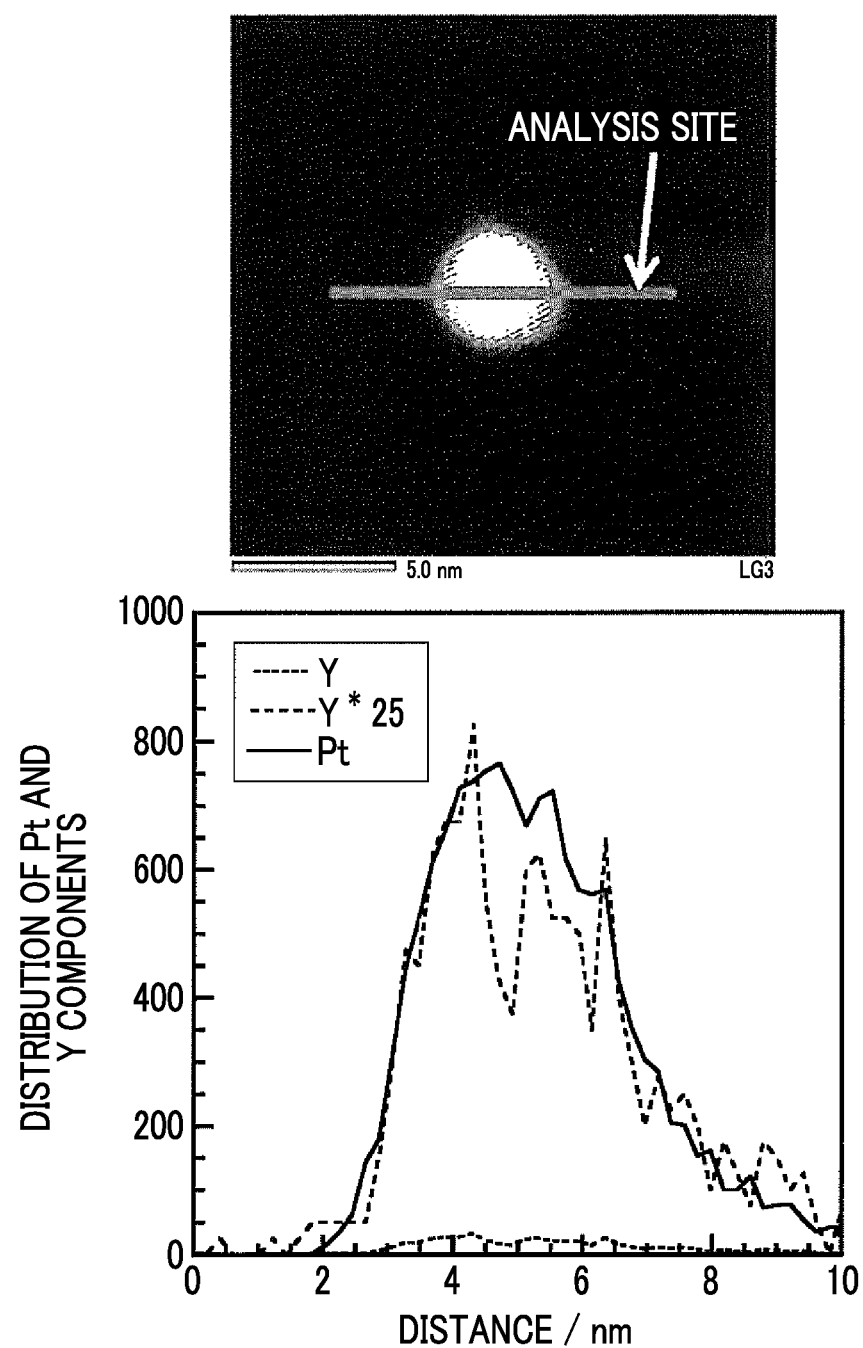
FIG. 8 shows distribution states of Pt and Y in the catalyst (Example 3) after the acid treatment.

(4) Aberration-Corrected STEM-EDS Observation Analysis (FIG. 8)

Using a STEM-EDS apparatus (JEM-ARM200F manufactured by JEOL Ltd.), the catalyst powder is collected in a STEM observation grid, and is observed and analyzed at an accelerating voltage of 200 kV. The profile of Y*25 is the result of plotting intensity by 25 times in order to check the distribution of Y.

Figure 6:
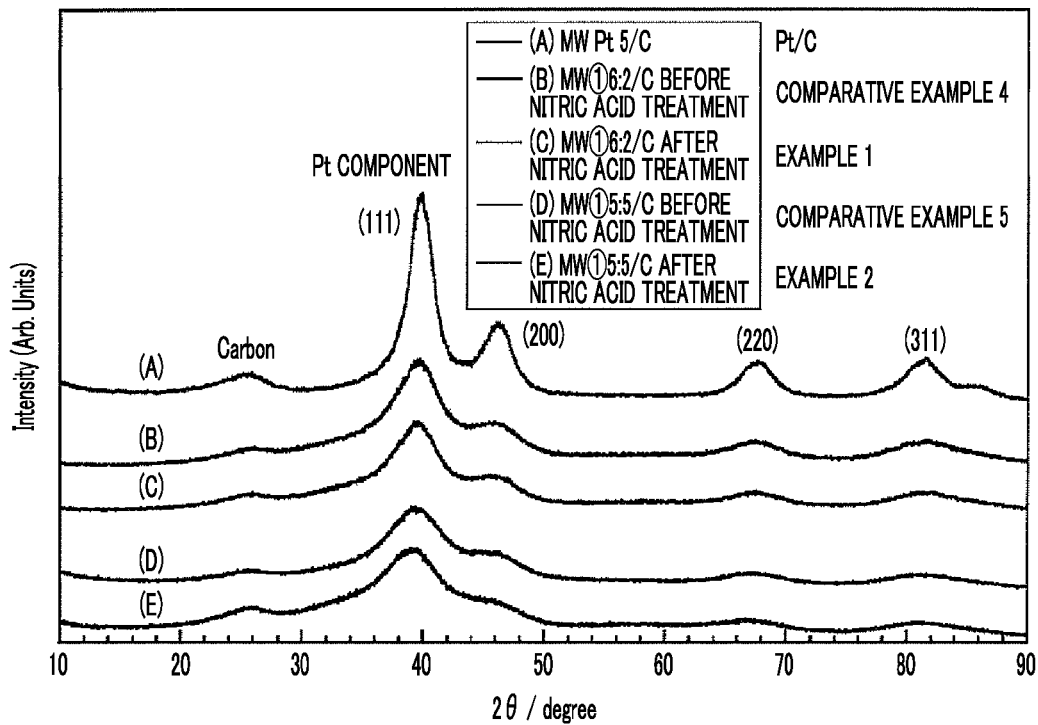
FIG. 6 shows XRD analysis results of the catalysts (Comparative Example 4 and Example 1, and Comparative Example 5 and Example 2) before and after the acid treatment.
Figure 7:
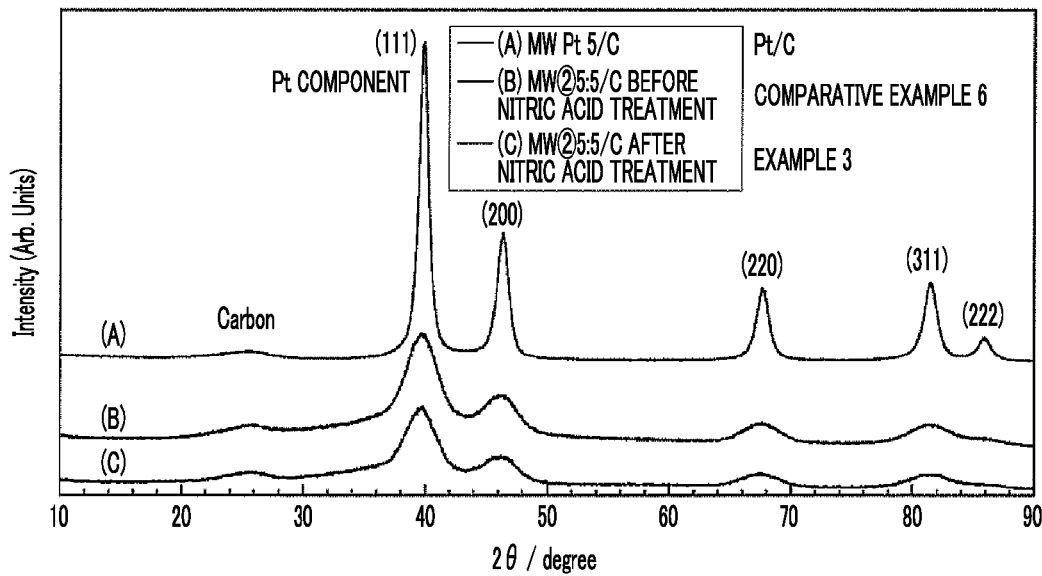
FIG. 7 shows XRD analysis results of the catalysts (Comparative Example 6 and Example 3) before and after the acid treatment.
Figure 10:
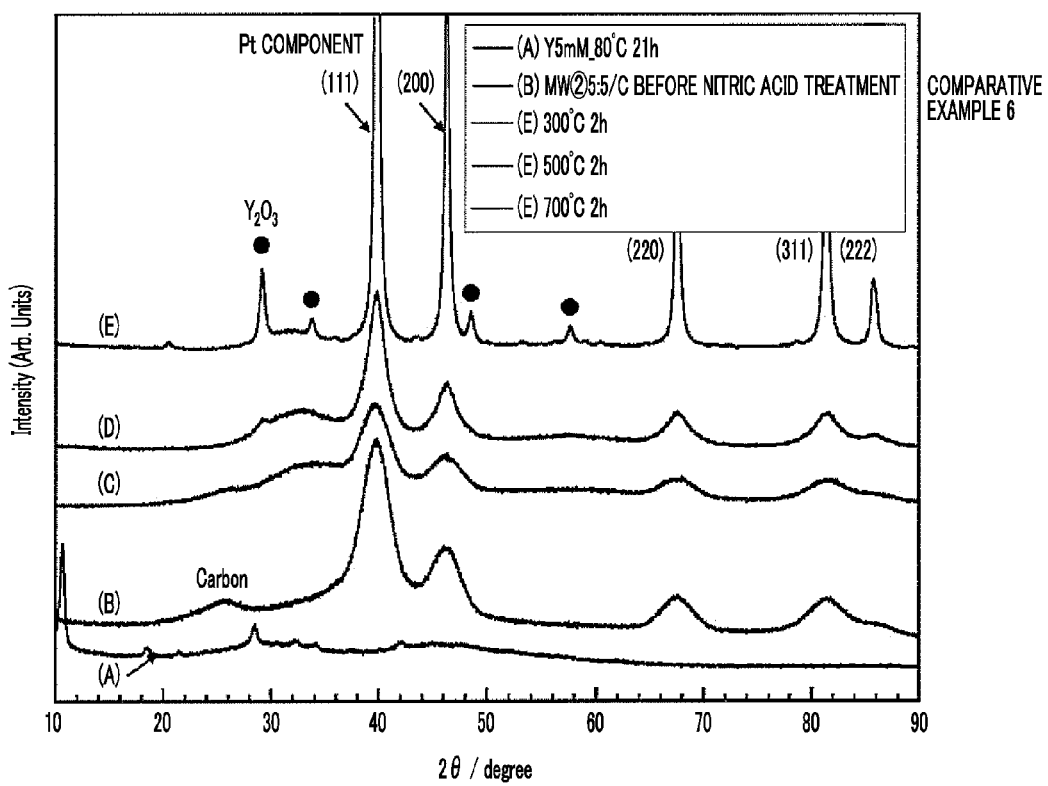
FIG. 10 shows XRD analysis results of a sample obtained by heating the catalyst (Comparative Example 6) before the acid treatment at a predetermined temperature.

(5) XRD Analysis (FIGS. 6, 7, and 10)

Using an XRD apparatus (TTRIII manufactured by Rigaku Corporation), the catalyst powder is collected in a sample holder and is measured at a wide angle at 50 kV and 300 mA.

Figure 11:
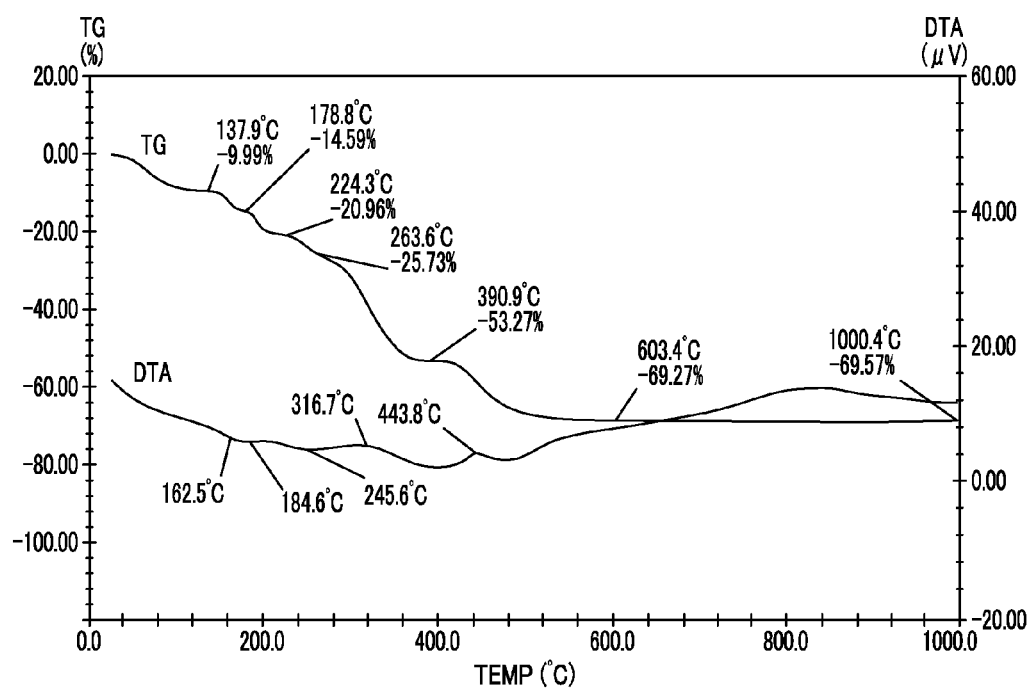
FIG. 11 shows a TG-DTA chart in which yttrium nitrate hexahydrate is heated in 4% $H_2$/Ar.

(6) In-Situ TG-DTA Analysis (FIG. 11)

Using a TG-DTA apparatus (TG-DTA2020SA manufactured by Bruker AXS GmbH), a predetermined amount of the catalyst powder was collected in an alumina pan and is measured in flowing 4% $H_2$/Ar (200 ml/min) while increasing the temperature up to 1000° C. at a heating rate of 5° C./min.

Figure 12:
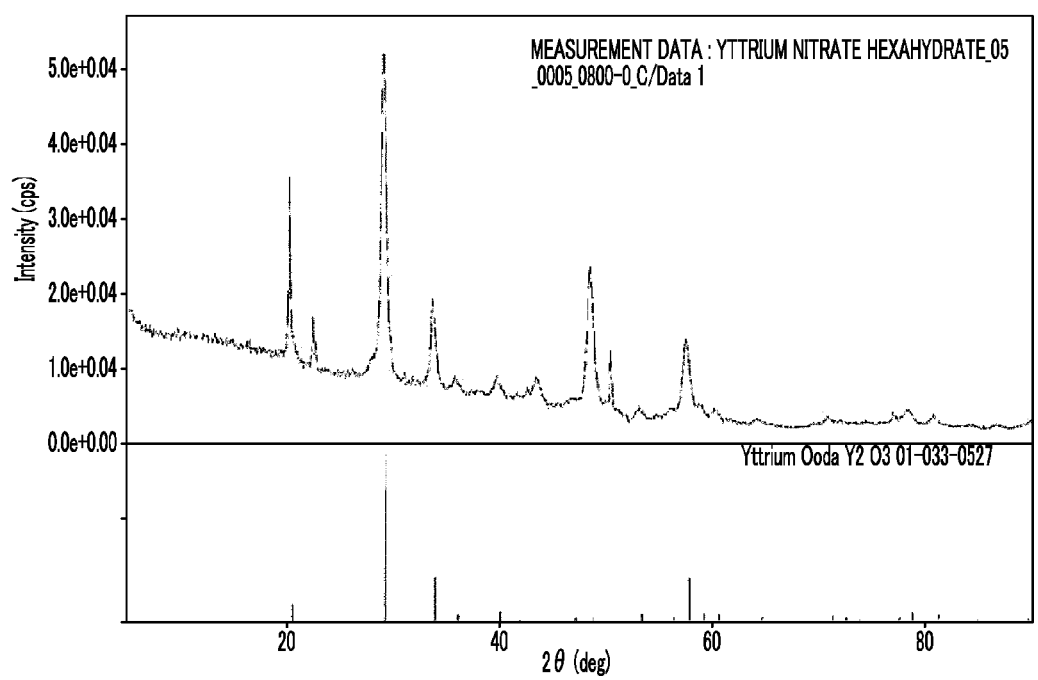
FIG. 12 shows XRD analysis results of a sample in which yttrium nitrate hexahydrate is heated in 4% $H_2$/Ar at 800° C.

(7) In-Situ XRD Analysis (Table 2, FIG. 12)

Using an XRD apparatus (SmartLab manufactured by Rigaku Corporation), the catalyst powder is collected in a sample holder and is measured at a wide angle in flowing 4% $H_2$/Ar (100 ml/min) while increasing the temperature up to 1000° C. at a heating rate of 5° C./min.

(8) RDE Evaluation (Table 1)

A predetermined amount of the catalyst powder is applied to a rotatable working electrode. In an electrolytic solution (0.1N perchloric acid), a potential with respect to a reference electrode (hydrogen electrode) is applied to the working electrode, and the value of current flowing between the working electrode and the counter electrode is measured.

First, by bubbling $N_2$ gas, the air in the electrolytic solution is degassed, and the surface of the catalyst is cleaned by a predetermined number of potential sweeps. Next, the area of hydrogen adsorption waves was determined by cyclic voltammetry (CV), and the amount of platinum in the catalyst applied to the working electrode is normalized, thereby calculating an electrochemical surface area (ECSA) (unit: $m^2$/g-Pt).

By switching to $O_2$ gas bubbling, the concentration of oxygen in the electrolytic solution is saturated. Thereafter, while changing the rotation speed of the working electrode, the potential is swept, thereby obtaining a potential-current curve. The current obtained at this time is an oxygen reduction current. Based on the potential-current curve at each rotation speed, a current value at a potential of 0.9 V at which the catalyst activity is dominant is read and normalized to the amount of platinum. A Koutecky-Levich plot is created from the rotation speed of the working electrode and the current value normalized to the amount of platinum. The limit current density obtained from the extrapolated value of infinite rotation speed is a mass activity (MA) (unit: A/g-Pt).

A specific activity (SA) is a value obtained by dividing the mass activity (unit: A/g-Pt) by the electrochemical surface area (unit: $m^2$/g-Pt), and is a reaction current value per platinum unit surface area. Specific activity is an indicator of the quality of the platinum surface. In this specification, the specific activity is expressed in units of $\mu A/cm^2$.

(9) MEA Evaluation (FIG. 1)

Evaluation is performed in the state of an MEA provided with an anode and a cathode on both sides of an electrolyte membrane. A Pt/C catalyst (Pt: 0.05 mg/$cm^2$) is used for the anode, and a PtCo/C catalyst (Pt: 0.2 mg/$cm^2$) is used for the cathode. An anode gas (100% RH $H_2$) and a cathode gas (100% RH air) are caused to flow, and the reaction current value (or voltage) derived from the power generation reaction flowing at this time is measured. After obtaining a current-voltage curve that dominates the performance of the catalyst activity, the reaction current value at a voltage of 0.9 V is obtained. This reaction current value is normalized to the amount of platinum for the cathode, thereby obtaining a mass activity (unit: A/g-Pt).

<Results> The composition and activity of the catalysts obtained in the examples and comparative Examples are shown in Table 1.

TABLE 1

| | | Composition | | | Activity (RDE) | | |
| | | Pt (wt %) | Y (wt %) | Pt/Y (atomic ratio) | ECSA ($m^2$/g) | MA (A/g) | SA ($\mu A/cm^2$) |
| --- | --- | --- | --- | --- | --- | --- | --- |
| | Method | | | | | | |
| Example 1 | Microwaves | 44.0 | 0.09 | 222.9 | 33 | 161 | 491 |
| | Acid treatment | | | | 36 | 166 | 458 |
| Example 2 | | 41.1 | 0.17 | 110.2 | 40 | 175 | 442 |
| | | | | | 49 | 188 | 384 |

TABLE 1-continued

| | Method | Composition Pt (wt %) | Y (wt %) | Pt/Y (atomic ratio) | Activity (RDE) ECSA ($m^2/g$) | MA (A/g) | SA ($\mu A/cm^2$) |
|---|---|---|---|---|---|---|---|
| Example 3 | | 38.0 | 0.09 | 192.5 | 27 | 197 | 720 |
| | | | | | 34 | 245 | 711 |
| Example 4 | $H_2$ heat treatment Acid treatment | 24.0 | 0.07 | 156.3 | 57 | 247 | 437 |
| Comparative Example 1 | Ar heat treatment Acid treatment | 40.0 | — | — | 50 | 173 | 347 |
| Comparative Example 2 | Reducing agent $H_2$ heat treatment | 43.0 | 6.89 | 2.8 | 36 | 107 | 299 |
| Comparative Example 3 | Reducing agent $H_2$ heat treatment Acid treatment | 47.9 | 0.08 | 273.0 | 34 | 120 | 349 |
| Comparative Example 4 | Microwaves | 42.6 | 2.12 | 9.2 | 39 | 195 | 503 |
| | | | | | 41 | 175 | 424 |
| Comparative Example 5 | | 34.8 | 9.09 | 1.7 | 40 | 152 | 381 |
| Comparative Example 6 | | 30.2 | 10.40 | 1.3 | 40 | 215 | 538 |
| | | | | | 35 | 205 | 585 |
| Comparative Example 7 | $H_2$ heat treatment | 23.9 | 3.82 | 2.9 | 51 | 117 | 228 |
| Comparative Example 8 | Reducing agent Ar heat treatment Acid treatment | 37.1 | Co 1.8 | Pt/Co 5.9 | 48 | 245 | 512 |

(1) Comparison Between Comparative Example 8 and Comparative Example 1

The catalyst of Comparative Example 8 is a PtCo catalyst. Compared to the Pt catalyst of Comparative Example 1, the mass activity and the specific activity were improved by the alloy effect. However, during the use of the catalyst, Co is eluted and inhibits proton conduction. Since the oxidation reduction potential of Co is −0.28 V and is thus lower than the potential of the cathode, elution of Co as cations cannot be avoided. In addition, since the oxidation reduction potential of Ni is −0.257 V and the oxidation reduction potential of Mn is −1.185 V, Ni or Mn is also eluted in the alloy catalyst of these metals and Pt.

In order to avoid elution of Co, it is necessary to reduce the amount of Co in the alloy. However, when the amount of Co is reduced, the alloy effect, which is indispensable for improving the catalyst activity, is reduced (FIG. 1).

(2) Comparison Between Examples 1 to 4 and Comparative Example 1

Even though the amount of Y is a trace amount of 100 to 250 in terms of Pt/Y (atomic ratio), the PtY catalysts of Examples 1 to 4 have a specific activity 1.1 to 2.1 times that of the Pt catalyst of Comparative Example 1. On the other hand, as understood from FIG. 1, in the case of the PtCo catalyst, when Pt/Co (atomic ratio) is in a range of 100 to 250, the mass activity thereof is not so different from that of the Pt catalyst. Therefore, only a trace amount of Y can exhibits its effects. In addition, since Y is in a trace amount, inhibition of proton conduction due to the elution of Y can be suppressed.

In addition, in comparison between Examples 1 to 3 in which microwaves were used and Example 4 in which the $H_2$ heat treatment was performed, the electrochemical surface area (ECSA) of Example 4 is slightly larger. It is conceivable that this is because catalyst particles are slightly agglomerated by microwave irradiation. Furthermore, in the heat treatment, the catalyst activity can be easily adjusted by changing temperature.

(3) Comparison Between Comparative Examples 4 to 7 and Examples 1 to 4

The PtY catalysts of Comparative Examples 4 to 7 are catalysts obtained without performing the acid treatment in Examples 1 to 4. By the acid treatment, the concentration of Y in the catalysts of Examples 1 to 4 significantly decrease compared to the catalysts of Comparative Examples 1 to 4. It is postulated that Y, which was present as an oxide, was dissolved in nitric acid by the acid treatment.

The fuel cell catalyst forms an electrode by being mixed with an ionomer which is a proton conductor. Since the ionomer is a super strong acid having sulfonic acid, Y eluted by the nitric acid treatment can elute similarly in the fuel cell electrode. Since the eluted Y becomes a trivalent cation and inhibits proton conduction, the catalysts of Comparative Examples 4 to 7 in which the concentration of Y is high cannot stably maintain their performance.

(4) Comparative Examples 2 and 3

The catalyst of Comparative Example 2 is a catalyst obtained by causing Pt and Y to be supported on a carrier in an aqueous solution and baking the resultant in a hydrogen atmosphere. The catalyst of Comparative Example 3 is a catalyst obtained by performing the acid treatment on the catalyst of Comparative Example 2. In Comparative Examples 2 and 3, since Y is supported at a pH of 9.5, Y is supported as a hydroxide. Both catalysts have lower specific activities than the catalysts of the examples.

<Analysis of Catalyst>

(1) TEM Observation (Comparative Example 4 and Example 1, Comparative Example 5 and Example 2, and Comparative Example 6 and Example 3)

The catalysts of Comparative Example 4 and Example 1, the catalysts of Comparative Example 5 and Example 2, and the catalysts of Comparative Example 6 and Example 3 were subjected to enlarged TEM observation to investigate the dispersion state of particles and determine the average particle size of the particles. The results are shown in FIGS. 2A and 2B. In all the cases of Examples 1, 2, and 3 and Comparative Examples 4, 5, and 6, catalyst fine particles were uniformly supported on the carbon carrier without agglomeration, and the average particle size of the catalyst fine particles was 2.8±0.4 nm in the catalyst of Comparative Example 4, 2.7±0.4 nm in the catalyst of Example 1, 2.7±0.7 nm in the catalyst of Comparative Example 5, 2.7±0.8 nm in the catalyst of Example 2, 3.1±0.7 nm in the catalyst of Comparative Example 6, and 3.1±0.6 nm in the catalyst of Example 3. As a result, the average particle size of the three catalysts was about 3 nm, and there was substantially no change in the average particle size before and after the acid treatment.

(2) TEM-EDS Observation Analysis (Comparative Example 4 and Example 1, Comparative Example 5 and Example 2, and Comparative Example 6 and Example 3)

TEM-EDS analysis was performed to investigate sites where Y was present. In TEM-EDS quantitative analysis, the observed local region is analyzed, and not the entire composition is analyzed unlike ICP analysis. The results are shown in FIGS. 3A, 3B, 4A, 4B, 5A, and 5B. The Pt:Y (atomic ratio) in the catalyst of Comparative Example 4 in FIG. 3A was 96:4. The Pt:Y (atomic ratio) in the catalyst of Example 1 in FIG. 3B was 100:0, and since the amount of Y is a trace amount, Y was not detected in the observed local region. The Pt:Y (atomic ratio) in the catalyst of Comparative Example 5 in FIG. 4A was 71:29, and the Pt:Y (atomic ratio) in the catalyst of Example 2 in FIG. 4B was 100:0. The Pt:Y (atomic ratio) in the catalyst of Comparative Example 6 in FIG. 5A was 86:14, and the Pt:Y (atomic ratio) in the catalyst of Example 3 in FIG. 5B was 99.7:0.3. Y present in the catalysts (Comparative Examples 4, 5, and 6) before the acid treatment had almost disappeared from the catalysts after the acid treatment (Examples 1, 2, and 3). This result was coincident with the composition analysis in Table 1.

(3) XRD Analysis (Comparative Example 4 and Example 1, Comparative Example 5 and Example 2, and Comparative Example 6 and Example 3)

The catalysts of Comparative Example 4 and Example 1, the catalysts of Comparative Example 5 and Example 2, and the catalysts of Comparative Example 6 and Example 3 were subjected to XRD analysis. The results are shown in FIGS. 6 and 7. In FIGS. 6 and 7, for comparison, the XRD analysis result of a Pt catalyst prepared by the microwave method was also described. When the Pt catalyst is adjusted without adding a Y reagent, agglomerate of Pt fine particles having a diameter of 10 to 20 nm are obtained, and XRD peaks have narrower and sharper line widths than those of the XRD peaks of Comparative Examples 4, 5, and 6 and Example 1, 2, and 3 to which the Y reagent was added. As shown in FIGS. 6 and 7, the XRD patterns of the Pt fine particles were not changed before and after the acid treatment, and only the peak of Pt was detected. Even in the catalysts of Comparative Examples 4, 5, and 6 before the acid treatment, peaks attributed to Y compounds were not detected. From these results, it is postulated that most of the Y present before the acid treatment is not an alloy with Pt but an amorphous oxide form.

(4) Aberration-corrected STEM-EDS Observation Analysis (Example 3)

As understood from the composition analysis in Table 1, a trace amount of Y is contained in the catalyst. Therefore, STEM-EDS line analysis was performed on the catalyst of Example 3 to investigate whether or not Y was present in the catalyst particles. The results are shown in FIG. 8. From FIG. 8, it was found that a slight amount of Y was present in the catalyst particles. Therefore, it is postulated that a trace amount of Y forms an alloy with Pt, resulting in the improvement of the specific activity.

(5) XPS Analysis (Comparative Examples 4 to 6) and XRD Analysis (Comparative Example 6)

The form of the Y compound present in the catalyst before the acid treatment was investigated.

Figure 9:
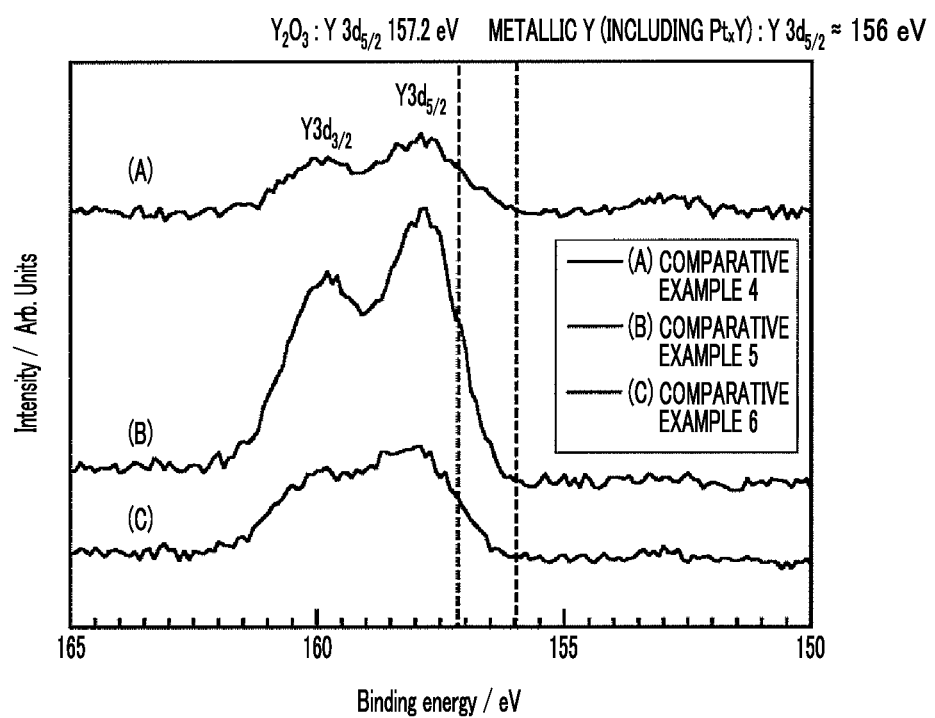
FIG. 9 shows XPS analysis results of the catalysts (Comparative Examples 4 to 6) before the acid treatment.

The catalysts of Comparative Examples 4 to 6 were subjected to XPS analysis. The results are shown in FIG. 9. From FIG. 9, it is postulated that Y is in the form of being further oxidized than $Y_2O_3$.

Furthermore, the catalyst of Comparative Example 6 was subjected to a heat treatment in air at 300° C., 500° C., or 700° C. to obtain an XRD diffractogram (FIG. 10). In FIG. 10, for comparison, the result of a sample obtained by reducing only yttrium acetate tetrahydrate by the microwave method is also described. In this case, a weak broad peak peculiar to an amorphous form was obtained. After a treatment at 700° C., a peak attributed to $Y_2O_3$ had appeared round 2θ=30°. The peak of $Y_2O_3$ had also appeared in a treatment at 500° C.

From these results, it is postulated that in the catalyst of Comparative Example 6, Y was present in the form of an amorphous oxide. The same is postulated for the catalysts of Comparative Examples 4 and 5.

(6) In-Situ TG-DTA Analysis and In-Situ XRD Analysis (Comparative Example 7 and Example 4)

The catalysts of Comparative Example 7 and Example 4 were prepared using a nonaqueous solvent. The morphology of yttrium nitrate hexahydrate after a heat treatment in a hydrogen atmosphere was investigated.

FIG. 11 is a TG-DTA chart in which yttrium nitrate hexahydrate was heated in 4% $H_2$/Ar. After mass reduction reactions in several stages, the resultant was stabilized at about 600° C., and thereafter there was no change.

Next, XRD analysis was performed on samples subjected to a heat treatment at 25° C., 180° C., 260° C., 400° C., and 800° C. on the basis of the mass change points in the TG-DTA chart. The results are shown in Table 2. An XRD diffractogram of the sample subjected to the heat treatment at 800° C. is shown in FIG. 12.

TABLE 2

| Identification compound | 25° C. | 180° C. | 260° C. | 400° C. | 800° C. |
|---|---|---|---|---|---|
| $Y(NO_3)_3 \cdot 6H_2O$ | A | — | — | — | — |
| $Y(NO_3)_3 \cdot H_2O$ | B | — | — | — | — |
| $Y(NO_3)_3 \cdot (H_2O)$ | — | B | B | — | — |
| $Y(NO_3)_3$ | — | — | B | B | — |
| $YO(NO_3)$ | — | — | — | B | — |
| $Y_2O_3$ | — | — | — | — | A |

A: indicates those containing a crystalline compound.
B: indicates a possibility of containing a crystalline compound.

As shown in Table 2 and FIG. 12, $Y_2O_3$ was detected in the sample subjected to the heat treatment at 800° C. In addition, as shown in FIG. 11, the decrease in mass is saturated at 600° C. or higher. Therefore, it is postulated that in the catalyst of Comparative Example 7 subjected to the heat treatment at 600° C., Y was present as $Y_2O_3$.

(6) Potential-pH Diagram Analysis (Comparative Examples 2 and 3)

Figure 13:
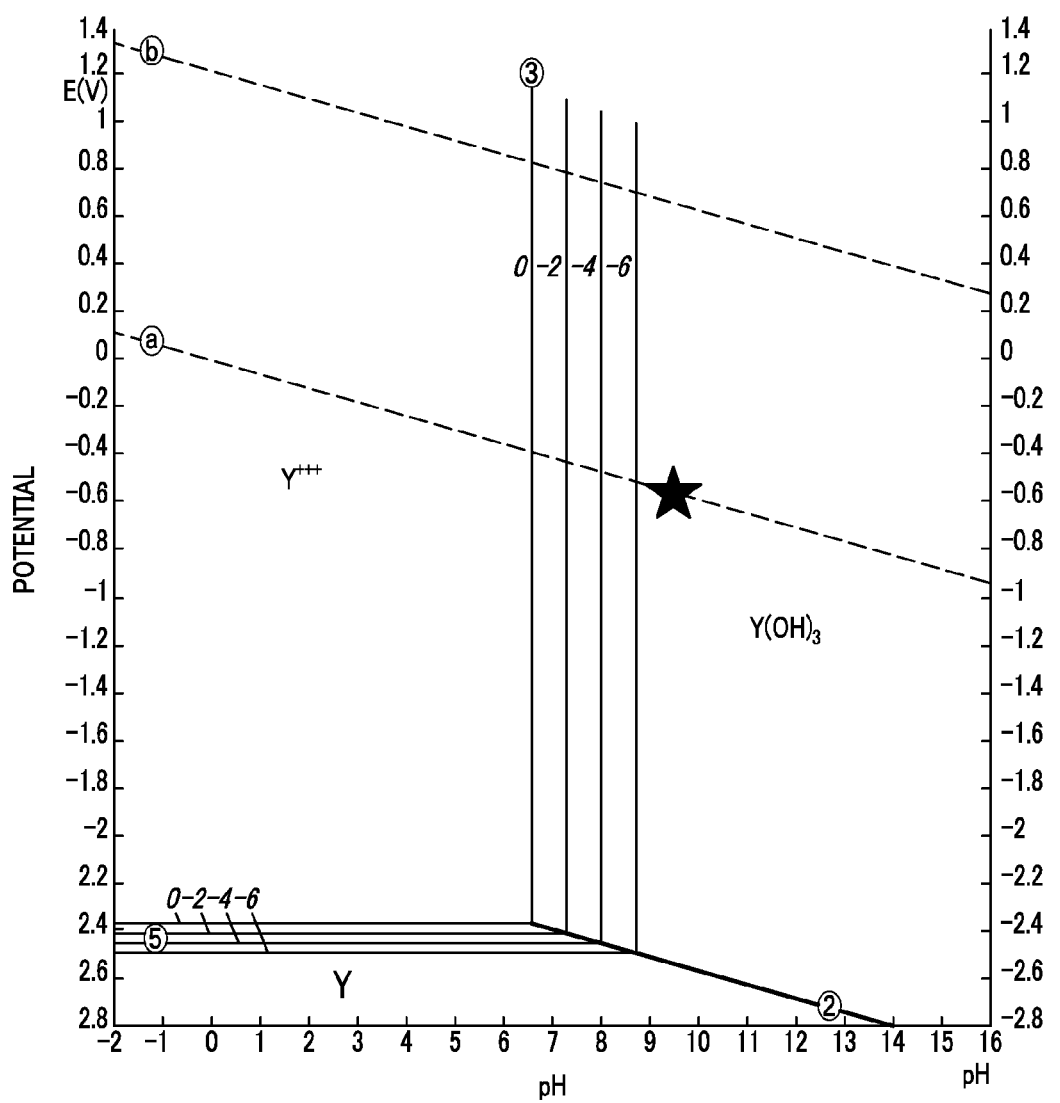
FIG. 13 shows a potential-pH diagram of Y.

The catalysts of Comparative Examples 2 and 3 were prepared in an aqueous solution. The condition at the time of supporting of Y on the potential-pH diagram of Y was plotted with an asterix (FIG. 13). Since the potential at the time of preparation is a value obtained on the basis of the Ag—AgCl electrode, the potential was corrected and plotted so as to be based on a hydrogen electrode. It is understood from FIG. 13 that Y is supported as $Y(OH)_3$. $Y(OH)_3$ is regarded as being changed to $Y_2O_3$ at 856° C. in hydrogen. Since the heat treatment temperature in the hydrogen atmosphere in Comparative Examples 2 and 3 is 700° C., it is postulated that the state of $Y(OH)_3$ is maintained even after the heat treatment.

What is claimed is:

1. A production method of a fuel cell electrode catalyst, comprising:
    causing platinum and yttrium to be supported on a carrier using a nonaqueous solvent; and
    performing an acid treatment on the carrier on which platinum and yttrium are supported.

2. The production method according to claim 1, wherein platinum and yttrium are supported on the carrier by mixing the nonaqueous solvent, a platinum salt, an yttrium salt, and the carrier and irradiating a mixture of the nonaqueous solvent, platinum, yttrium, and the carrier with microwaves.

3. The production method according to claim 1, wherein platinum and yttrium are supported on the carrier by mixing the nonaqueous solvent, a platinum salt, an yttrium salt, and the carrier, removing the nonaqueous solvent from a mixture of the nonaqueous solvent, platinum, yttrium, and the carrier, and performing a heat treatment on the mixture from which the nonaqueous solvent is removed in a hydrogen atmosphere.

4. The production method according to claim 1, wherein an atomic ratio of platinum to yttrium in the fuel cell electrode catalyst is caused to be 100 to 250 by performing the acid treatment on the carrier on which platinum and yttrium are supported.

5. A fuel cell electrode catalyst produced by the production method according to claim 1.

6. A fuel cell comprising the fuel cell electrode catalyst according to claim 5.

* * * * *